(12) United States Patent
Jo

(10) Patent No.: US 11,648,909 B2
(45) Date of Patent: May 16, 2023

(54) SIDE AIRBAG

(71) Applicant: HYUNDAI MOBIS CO., LTD., Seoul (KR)

(72) Inventor: Kum Ho Jo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/560,034

(22) Filed: Dec. 22, 2021

(65) Prior Publication Data

US 2022/0227327 A1    Jul. 21, 2022

(30) Foreign Application Priority Data

Jan. 18, 2021  (KR) .................. 10-2021-0006613

(51) Int. Cl.
  *B60R 21/217*   (2011.01)
  *B60R 21/239*   (2006.01)

(52) U.S. Cl.
  CPC .......... *B60R 21/217* (2013.01); *B60R 21/239* (2013.01)

(58) Field of Classification Search
  CPC .... B60R 21/23138; B60R 2021/23146; B60R 2021/23324
  See application file for complete search history.

(56) References Cited

U.S. PATENT DOCUMENTS

| | | | |
|---|---|---|---|
| 8,596,678 B2 * | 12/2013 | Ravenberg .......... | B60R 21/2346 280/730.2 |
| 8,628,111 B2 * | 1/2014 | Sugimoto ............. | B60R 21/237 280/739 |
| 8,657,330 B1 * | 2/2014 | Choi ..................... | B60R 21/233 280/736 |
| 8,757,657 B1 * | 6/2014 | Hotta ................. | B60R 21/23138 280/739 |
| 9,573,551 B1 * | 2/2017 | Wang .................. | B60R 21/2346 |
| 10,981,533 B2 * | 4/2021 | Kobayashi ........ | B60R 21/23138 |
| 2010/0181749 A1 * | 7/2010 | Sugimoto ........... | B60R 21/2334 280/743.2 |
| 2014/0145422 A1 * | 5/2014 | Koike ................... | B60R 21/239 280/743.1 |
| 2016/0075303 A1 * | 3/2016 | Iida ..................... | B60R 21/2338 280/729 |

(Continued)

FOREIGN PATENT DOCUMENTS

| CN | 111086478 A | * | 5/2020 | .......... B60R 21/207 |
|---|---|---|---|---|
| CN | 109641565 B | * | 8/2021 | ....... B60R 21/23138 |

(Continued)

*Primary Examiner* — Nicole T Verley
(74) *Attorney, Agent, or Firm* — DLA Piper LLP (US)

(57) ABSTRACT

A side airbag that is configured to reduce risk of injury to a passenger by differentiating inner pressures in an airbag cushion at the beginning of a deployment of the airbag cushion. The side airbag includes a diffuser configured to supply gas discharged from an inflator to an inside of an airbag cushion, a separator partitioning an internal space of the airbag cushion up and down so that an upper region of the airbag cushion is more rapidly inflated than a lower region of the airbag cushion by the gas introduced into the airbag cushion through the diffuser, and a passage formed between the upper region and the lower region such that the gas flows between the upper region and the lower region.

11 Claims, 6 Drawing Sheets

(56) References Cited

U.S. PATENT DOCUMENTS

| | | | | |
|---|---|---|---|---|
| 2016/0090060 A1* | 3/2016 | Fujiwara | ............. | B60R 21/2334 280/730.2 |
| 2016/0101758 A1* | 4/2016 | Fujiwara | ........... | B60R 21/23138 280/729 |
| 2016/0304047 A1* | 10/2016 | Tsukagoshi | ....... | B60R 21/23138 |
| 2017/0267206 A1* | 9/2017 | Hanks | ................... | B60R 21/207 |
| 2021/0024030 A1* | 1/2021 | Fuma | ................... | B60R 21/207 |

FOREIGN PATENT DOCUMENTS

| | | | | | |
|---|---|---|---|---|---|
| CN | 109963754 B | * | 9/2021 | ........... | B60R 21/207 |
| DE | 102009020935 A1 | * | 12/2009 | ....... | B60R 21/23138 |
| DE | 202020107482 U1 | * | 5/2021 | ........... | B60R 21/013 |
| EP | 0800961 A1 | * | 10/1997 | | |
| EP | 3643566 A1 | * | 4/2020 | ........... | B60R 21/207 |
| JP | 4504116 B2 | * | 7/2010 | ....... | B60R 21/23138 |
| JP | 2014019320 A | * | 2/2014 | | |
| JP | 2014051281 A | * | 3/2014 | ........... | B60R 21/233 |
| JP | 2014136452 A | * | 7/2014 | | |
| JP | 2014156233 A | * | 8/2014 | | |
| JP | 2015085768 A | * | 5/2015 | ........... | B60R 21/207 |
| JP | 2016203878 A | * | 12/2016 | | |
| JP | 6207742 B2 | * | 10/2017 | ........... | B60R 21/207 |
| JP | 6354044 B2 | * | 7/2018 | | |
| JP | 2021049878 A | * | 4/2021 | ....... | B60R 21/23138 |
| KR | 10-2008-0036780 | | 4/2008 | | |
| KR | 20130017293 A | * | 2/2013 | | |
| WO | WO-9714586 A1 | * | 4/1997 | ........... | B60R 21/207 |
| WO | WO-2010092454 A1 | * | 8/2010 | ....... | B60R 21/23138 |
| WO | WO-2010092844 A1 | * | 8/2010 | ........... | B60R 21/207 |
| WO | WO-2010131326 A1 | * | 11/2010 | ....... | B60R 21/23138 |
| WO | WO-2010133950 A1 | * | 11/2010 | ....... | B60R 21/23138 |
| WO | WO-2011077510 A1 | * | 6/2011 | ....... | B60R 21/23138 |
| WO | WO-2013031009 A1 | * | 3/2013 | ........... | B60R 21/231 |
| WO | WO-2013119048 A1 | * | 8/2013 | ....... | B60R 21/23138 |
| WO | WO-2013157082 A1 | * | 10/2013 | ....... | B60R 21/23138 |
| WO | WO-2014115351 A1 | * | 7/2014 | ....... | B60R 21/23138 |
| WO | WO-2015020052 A1 | * | 2/2015 | ........... | B60R 21/207 |
| WO | WO-2015045613 A1 | * | 4/2015 | ............... | B60N 2/42 |
| WO | WO-2015064416 A1 | * | 5/2015 | ........... | B60R 21/207 |
| WO | WO-2015075984 A1 | * | 5/2015 | ........... | B60R 21/207 |
| WO | WO-2016013279 A1 | * | 1/2016 | ........... | B60R 21/207 |

* cited by examiner

SIDE AIRBAG

CROSS REFERENCE TO RELATED APPLICATION

The present application claims priority to Korean Patent Application No. 10-2021-0006613, filed Jan. 18, 2021, the entire contents of which is incorporated herein for all purposes by this reference.

BACKGROUND OF THE INVENTION

Field of the Invention

The present invention relates to a side airbag that is configured to reduce risk of injury to a passenger by differentiating internal pressures in an airbag cushion at the beginning of a deployment of the airbag cushion.

Description of the Related Art

Generally, an airbag is installed in an interior of a vehicle to protect a passenger from an impact that occurs during a vehicle collision.

An airbag cushion that is normally provided in a folded state in an airbag housing is instantaneously deployed due to gas quickly supplied into the airbag cushion by an inflator when a sensor detects the vehicle collision, and thus the passenger in the vehicle can be protected from the impact of the vehicle collision.

Meanwhile, a side airbag is mounted at a side surface of a seat, and protects a side of a passenger by deploying an airbag cushion when the vehicle collision is detected.

However, existing side airbags have a problem that an injury is concentrated on a chest portion of the passenger compared to a shoulder portion of the passenger.

As such, the reason that the injury is concentrated on the chest portion of the passenger is that the sensitivity of the injury to the amount of intrusion of a structure at the chest portion and an abdomen portion of the passenger is higher than the shoulder portion of the passenger. Therefore, there is a need for a method that is capable of reducing injuries to the chest and abdomen due to a structure that invades a vehicle from a side of the vehicle.

The foregoing is intended merely to aid in the understanding of the background of the present invention, and is not intended to mean that the present invention falls within the purview of the related art that is already known to those skilled in the art.

SUMMARY OF THE INVENTION

The present invention has been made keeping in mind the problems occurring in the related art, and an objective of the present invention is to provide a side airbag that is configured to reduce risk of injury to a passenger by differentiating internal pressures in an airbag cushion at a beginning of a deployment of the airbag cushion.

In order to achieve the objective of the present invention, a side airbag of the present invention may include: a diffuser configured to supply gas discharged from an inflator to an inside of an airbag cushion; a separator partitioning an internal space of the airbag cushion up and down so that an upper region of the airbag cushion is more rapidly inflated than a lower region of the airbag cushion by the gas introduced into the airbag cushion through the diffuser; and a passage formed between the upper region and the lower region such that the gas flows between the upper region and the lower region.

The separator may be partitioned such that a volume of the upper region is smaller than a volume of the lower region.

The upper region may have a pressure higher than a pressure of the lower region at a beginning of a deployment of the airbag cushion.

A front end of the separator may be positioned beside a shoulder portion of a passenger, and a rear end of the separator may be positioned beside a chest portion of the passenger.

The separator may be inclined downwardly from a front end to a rear end of the airbag cushion such that the airbag cushion is partitioned.

The separator may be sewn to opposite inner side surfaces of the airbag cushion, and a maximum width of the separator in a deployed state may be shorter than a maximum width of the airbag cushion.

A vent hole may be provided at the lower region.

The diffuser may be fixed to an inner side surface of a rear end of the airbag cushion, the separator may be fixed to the inner side surface of a front end of the airbag cushion toward the inner side surface of the rear end of the airbag cushion, and the passage may be formed between the separator and the diffuser.

The side airbag may further include an inner pocket formed in a tunnel shape in which a top end and a bottom end of the tunnel shape are open, the inner pocket may surround the diffuser, and a rear end of the separator may be fixed to an outer surface of a front end of the inner pocket. Further, a portion of the outer surface of the inner pocket except for the front end of the inner pocket may be fixed to the inner side surface of the airbag cushion such that the passage is formed inside the inner pocket.

The diffuser may be formed in a tunnel shape in which a top end a bottom end of the tunnel shape are open, so that the gas discharged from the inflator is distributed to the upper region and the lower region.

The diffuser may be formed in a tunnel shape in which a top end a bottom end of the tunnel shape are open, so that the gas discharged from the inflator is distributed to the upper region and the lower region. Further, a cross-sectional area of the opened top end of the diffuser may be smaller than a cross-sectional area of the opened bottom end of the diffuser.

The diffuser may be formed in a shape in which a top end of the diffuser is open and a bottom end of the diffuser is closed, so that the gas discharged from the inflator is provided only to the upper region.

According to the present invention, during at the beginning of the deployment of the airbag, since the upper region of the airbag cushion is more rapidly inflated and deployed than the lower region of the airbag cushion by the separator that is provided inside the airbag cushion, the shoulder portion of the passenger is pushed ahead of the chest portion of the passenger, so that there is an effect that the risk of the injury occurring at the chest portion and the abdomen portion of the passenger caused by a structure invading inside the vehicle is reduced.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Hereinbelow, an exemplary embodiment of the present invention will be described with reference to the accompanying drawings.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Figure 1:
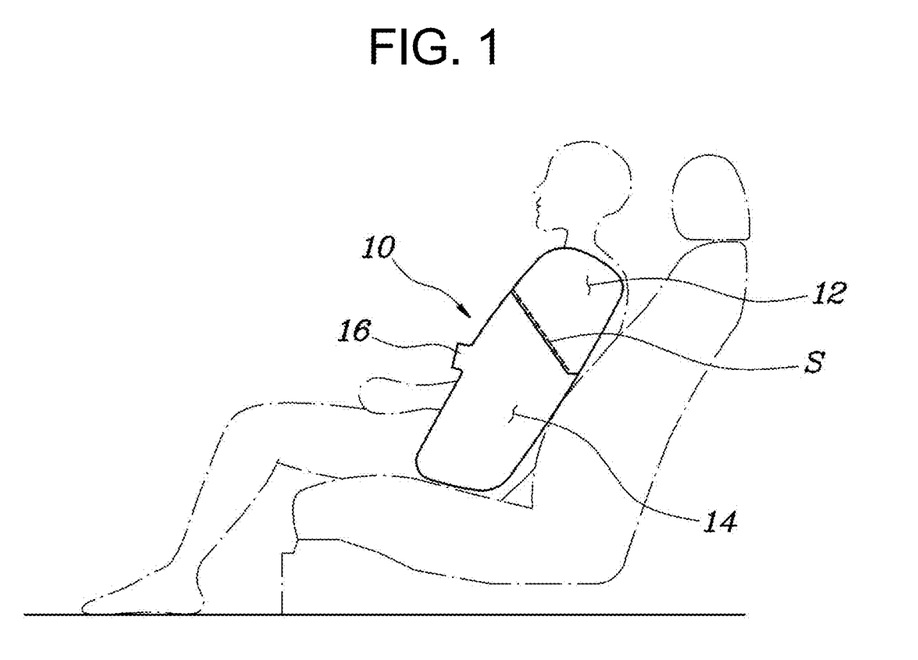
FIG. 1 is a view illustrating an external appearance of a side airbag according to the present invention in an applied state.
Figure 2:
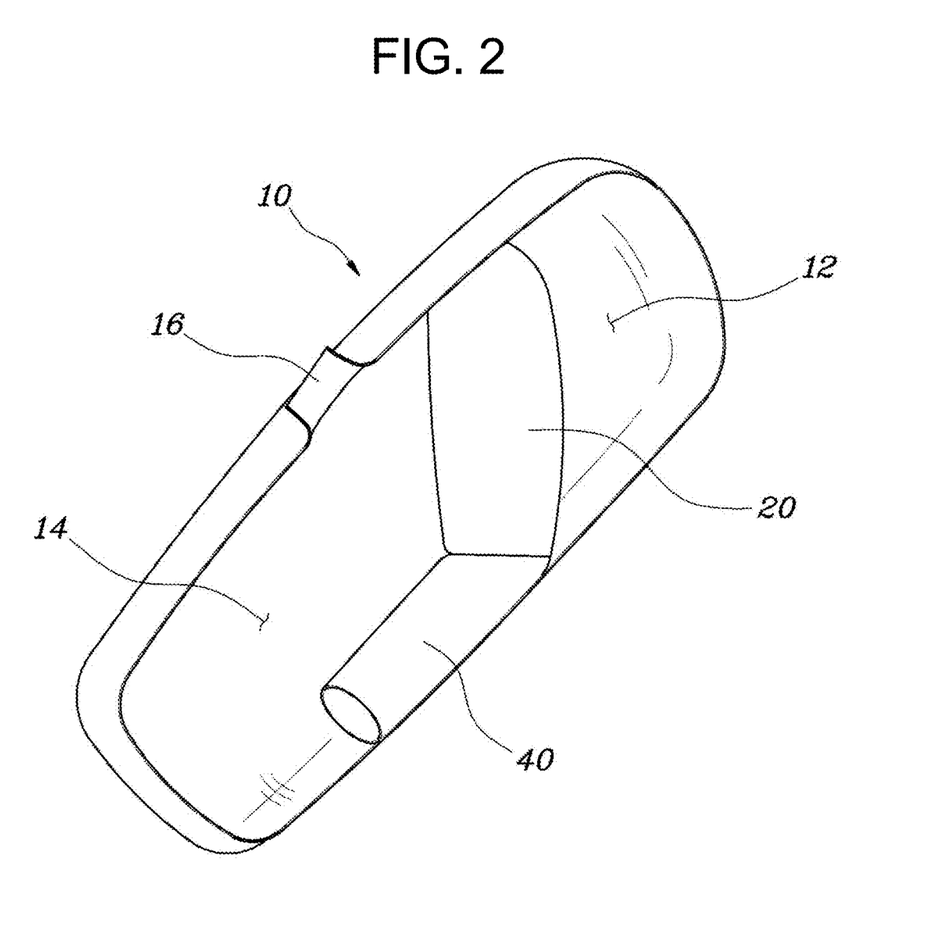
FIG. 2 is a view illustrating an internal structure of an airbag cushion according to the present invention by cutting the airbag cushion.
Figure 3:
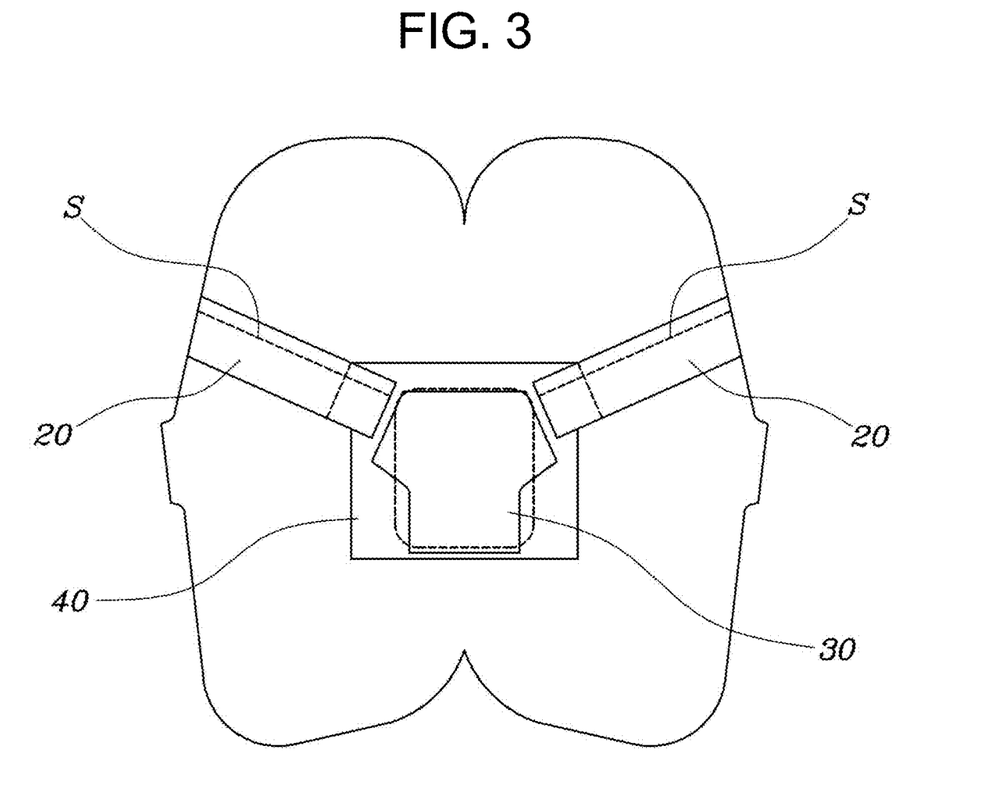
FIG. 3 is a view illustrating a shape of the airbag cushion of the present invention before being sewn.
Figure 4:
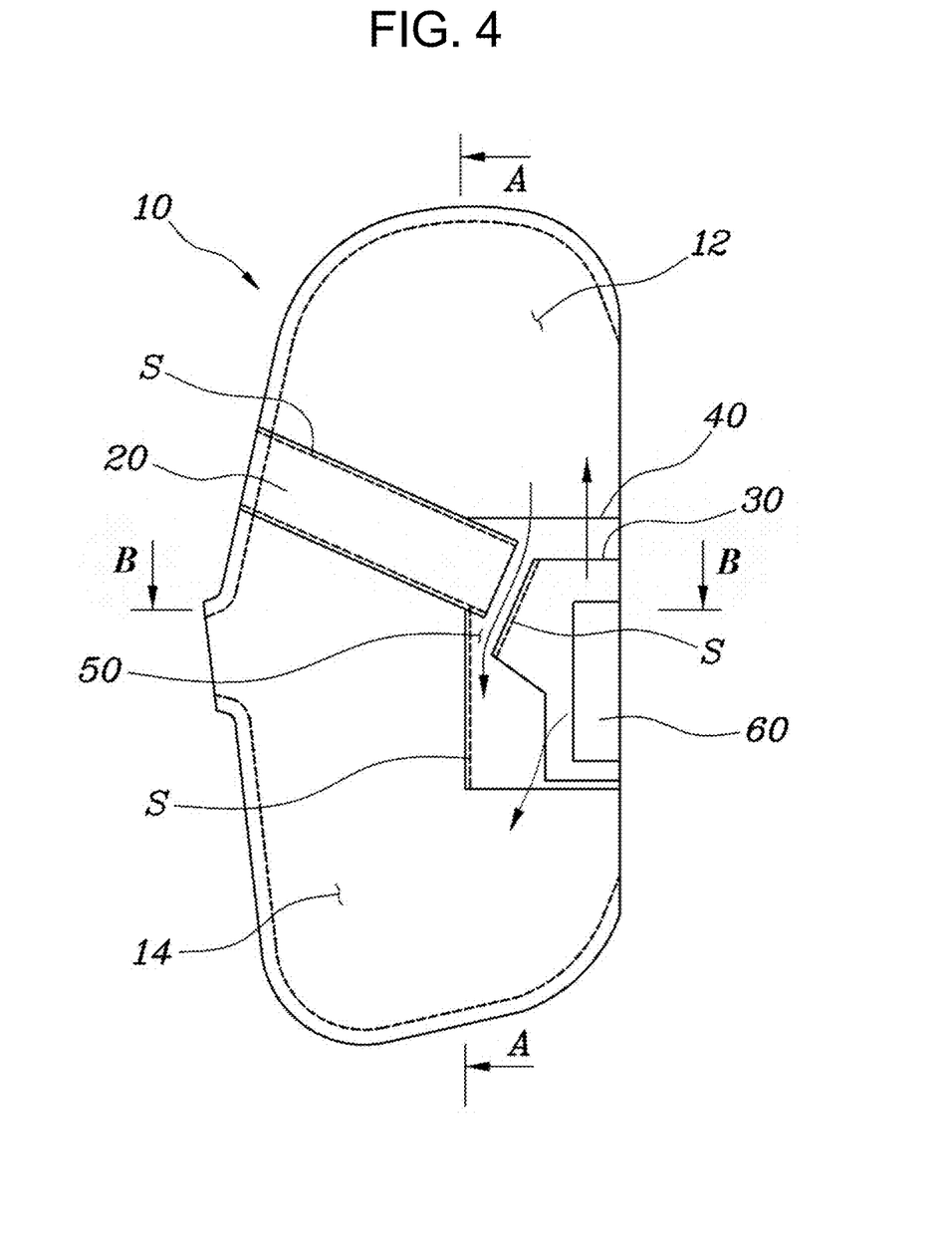
FIG. 4 is a view illustrating the shape of the airbag cushion of the present invention after being sewn.

FIG. 1 is a view illustrating an external appearance of a side airbag according to the present invention in an applied state. FIG. 2 is a view illustrating an internal structure of an airbag cushion 10 according to the present invention by cutting the airbag cushion 10. FIG. 3 is a view illustrating a shape of the airbag cushion 10 of the present invention before being sewn (s). FIG. 4 is a view illustrating the shape of the airbag cushion of the present invention after being sewn (s).

Referring to the drawings, the side airbag of the present invention includes: a diffuser 30 configured to supply gas discharged from an inflator 60 to an inside of the airbag cushion 10; a separator 20 partitioning an internal space of the airbag cushion 10 up and down so that an upper region 12 is more rapidly inflated than a lower region 14 by the gas introduced through the diffuser 30; and a passage 50 formed between the upper region 12 and the lower region 14 and enabling the gas to flow between the upper region 12 and the lower region 14.

Here, the upper region 12 of the airbag cushion 10 is positioned beside a shoulder portion of a passenger, and the lower region 14 of the airbag cushion 10 is positioned beside a chest portion and an abdomen portion of the passenger.

That is, when a collision signal is detected at a sensor during a vehicle collision, the inflator 60 explodes and gas is provided inside the airbag cushion 10.

At this time, by the separator 20 that is provided inside the airbag cushion 10, the upper region 12 of the airbag cushion 10 inflates and deploys faster than the lower region 14.

Therefore, since the upper region 12 is inflated faster than the lower region 14, the shoulder portion of the passenger is restrained early and also the inflated upper region 12 pushes out the shoulder portion of the passenger earlier than the chest portion of the passenger, so that the risk of injuries in the chest portion and the abdomen portion of the passenger caused by a structure invading into the vehicle may be reduced.

In addition, as an exemplary embodiment for inflating the upper region 12 of the airbag cushion 10 faster than the lower region 14, the separator 20 may segment the upper region 12 and the lower region 14 such that a volume of the upper region 12 is smaller than a volume of the lower region 14.

Accordingly, at the beginning of the deployment of the airbag cushion 10, a pressure of the upper region 12 is higher than a pressure of the lower region 14.

For example, since the separator 20 partitions the airbag cushion 10 by being positioned at an upper portion of the airbag cushion 10 in a vertical length of the airbag cushion 10 as illustrated in FIG. 1, the volume of an internal portion of the upper region 12 is smaller than the volume of an internal portion of the lower region 14, and thus the upper region 12 is inflated and deployed more faster than the lower region 14, so that the pressure of the upper region 12 at the beginning of the deployment of the airbag cushion 10 is higher than the pressure of the lower region 14.

In addition, the separator 20 may be configured such that a front end of the separator 20 is positioned beside the shoulder portion of the passenger and a rear end of the separator 20 is positioned beside the chest portion of the passenger.

For example, the separator 20 may be formed in a shape that crosses the inner portion of the airbag cushion 10 in an anteroposterior direction. Further, since the separator 20 is inclined downwardly from the front end of the separator 20 to the rear end of the separator 20 such that the airbag cushion 10 is partitioned, the front end of the separator 20 is positioned beside the shoulder portion of the passenger and the rear end of the separator 20 is positioned beside the chest portion of the passenger.

Therefore, the shoulder portion of the passenger is positioned within the upper region 12 that is partitioned by the separator 20, so that the shoulder portion of the passenger is accurately restrained within the upper region 12.

Figure 5:
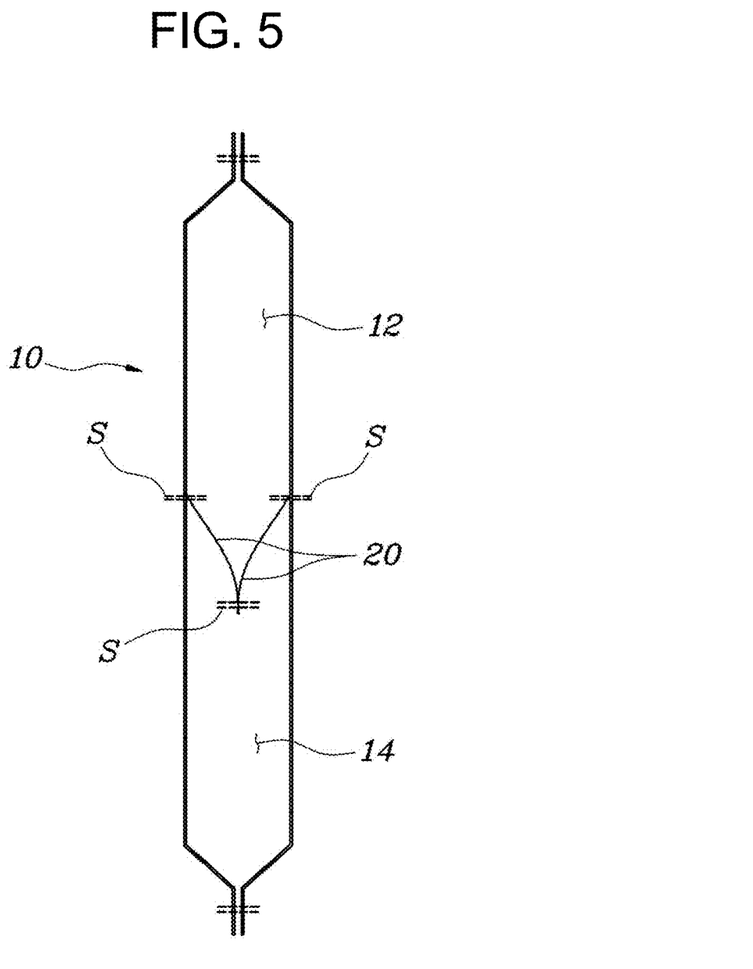
FIG. 5 is a cross-sectional view taken along line A-A in FIG. 4.

Meanwhile, referring to FIGS. 4 and 5, the separator 20 is sewn between opposite inner side surfaces of the airbag cushion 10, and the maximum width of the separator 20 may be shorter than the maximum width of the airbag cushion 10 when the airbag cushion 10 is deployed.

That is, when the airbag cushion 10 is inflated, the width of the airbag cushion 10 is regulated by the separator 20, so that the volume inside the upper region 12 is reduced as the width of the separator 20 is reduced. Therefore, by more rapidly deploying the upper region 12, the risk of the injury of the passenger is reduced.

In addition, a vent hole 16 may be provided at the lower region 14.

For example, the vent hole 16 may be formed in a front end of the lower region 14.

Accordingly, since the upper region 12 maintains the inflated states at least a specific pressure at the beginning of the deployment of the airbag, the shoulder portion of the passenger may be pushed out, so that the risk of injuries at the chest portion and the abdomen portion of the passenger may be reduced.

In addition, referring to FIGS. 3 and 4, the diffuser 30 is fixed at an inner side surface of a rear end of the airbag cushion 10, the separator 20 is fixed to the airbag cushion 10 such that the separator is directing toward the rear end of the airbag cushion 10 from the front end of the airbag cushion 10, and a passage 50 may be formed between the separator 20 and the diffuser 30.

For example, the airbag cushion 10 is formed such that two oval shaped panels are overlapped together and a border except for the rear end of the airbag cushion 10 and the vent hole 16 are sewn s.

Accordingly, on the basis of the airbag cushion 10 that is sewn s, the front end of the separator 20 is sewn toward the rear end of an inner side surface of both panels from a front end of both panels.

However, the rear end of the separator 20 is not sewn up to an end of the rear end of the panels, and the separator 20 is sewn up to a middle portion of the panels.

In addition, since an outer surface of a rear end of the diffuser 30 is fixed to an inner side of the rear end of the airbag cushion 10, the passage 50 may be formed between the front end of the diffuser 30 and the rear end of the separator 20.

Figure 6:
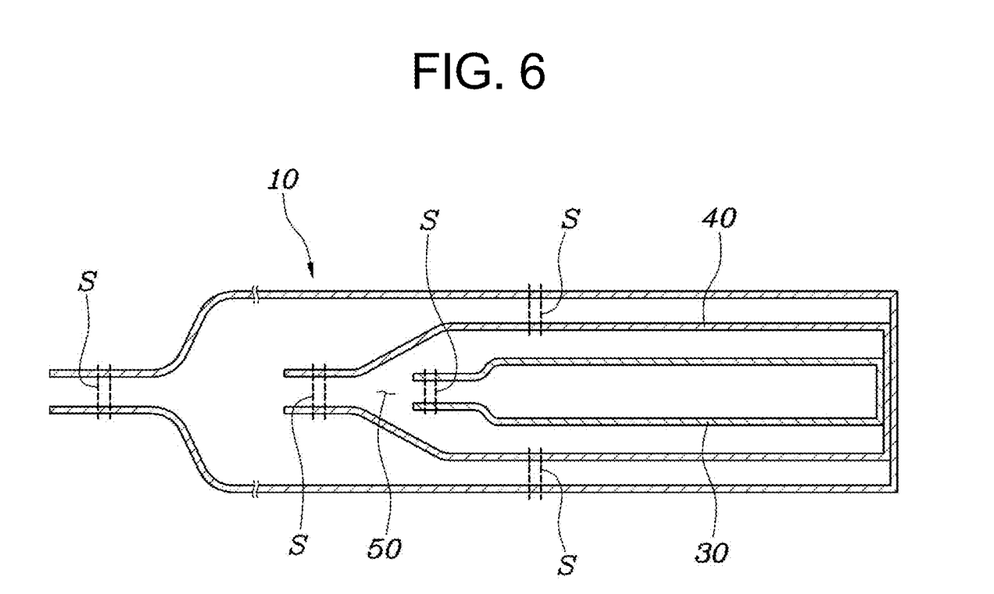
FIG. 6 is a cross-sectional view taken along line B-B in FIG. 4.

In addition, referring to FIGS. 4 and 6, an inner pocket 40 surrounding the diffuser 30 and formed in a shape of a tunnel in which a top end and a bottom end are open may be further included.

In addition, the rear end of the separator 20 may be fixed to an outer surface of a front end of the inner pocket 40, and an outer surface of the inner pocket 40 except for the front end of the inner pocket 40 may be fixed to the inner side surface of the airbag cushion 10, so that the passage 50 may be formed inside the inner pocket 40.

For example, the outer surface of the rear end of the diffuser 30 is fixed to the inner surface of the rear end of the inner pocket 40, and the outer surface of the rear end of the inner pocket 40 is fixed to the inner side surface of the rear end of the airbag cushion 10.

In addition, both outer side surfaces of the inner pocket 40 are sewn s to the respective inner side surfaces of the panels, and the rear end of the separator 20 is sewn to the outer surface of the front end of the inner pocket 40, so that an inner space of the inner pocket 40 except for the diffuser 30 becomes the passage 50.

Therefore, the gas rapidly filled in the upper region 12 at the beginning of the deployment of the airbag cushion 10 flows to the lower region 14 through the passage 50, and the gas at the lower region 14 exits to the outside through the vent hole 16 when a load is applied to the lower region 14 by the passenger, so that the passenger may be safely protected.

In addition, referring to FIG. 4, the diffuser 30 is formed in a tunnel shape in which an upper end and a lower end thereof are open, so that the gas discharged from the inflator 60 may be distributed up and down.

That is, the gas of the inflator 60 is introduced in to the diffuser 30, and is capable of being supplied inside the upper region 12 and the lower region 14 through opened portions at the top end and the bottom end of the diffuser 30.

In addition, in order to prevent the diffuser from a phenomenon of a heat when the gas is generated, the diffuser 30 may be formed of a heat resistant material.

However, although not illustrated, by transforming a structure of the diffuser 30, an amount of the gas discharged to the upper region 12 is larger than an amount of the gas discharged to the lower region 14 so that the upper region 12 may be more rapidly deployed than the lower region 14.

To this end, the diffuser 30 may be formed in the tunnel shape in which the upper end and the lower end thereof are open such that the gas discharged from the inflator 60 is distributed up and down, and a cross-sectional area of the opening portion at the top end of the diffuser 30 may be smaller than a cross-sectional area of the opening portion at the bottom end of the diffuser 30.

That is, the amount of the gas discharged through the opening portion at the top end of the diffuser 30 is more than the amount of the gas discharged through the opening portion at the bottom end of the diffuser 30, so that the upper region 12 is more rapidly deployed than the lower region 14.

As another example of the diffuser 30, the diffuser 30 may be formed such that the top end of the diffuser 30 is open and the bottom end of the diffuser is closed and thus the gas discharged from the inflator 60 is supplied only to the upper region 12.

That is, by configuring the gas supplied through the diffuser 30 to be supplied only to the upper region 12, the upper region 12 may be more rapidly deployed than the lower region 14.

Hereinafter, an action and an effect of the side airbag of the present invention will be described.

When a sensor detects a collision signal during a collision of a vehicle, the inflator 60 explodes and gas is generated.

In addition, the gas generated from the inflator 60 is supplied to the diffuser 30, and the gas supplied to the diffuser 30 is distributed to the upper region 12 and the lower region 14, so that the airbag cushion 10 is inflated and deployed.

However, since the airbag cushion 10 is designed that the volume of the upper region 12 is smaller than the volume of the lower region 14 by the separator 20 provided inside the airbag cushion 10, the upper region 12 of the airbag cushion 10 is more rapidly deployed than the lower region 14 at the beginning of the deployment of the airbag.

In addition, since the upper region 12 is more rapidly inflated than the lower region 14, the shoulder portion of the passenger is restrained early.

Therefore, by the inflated upper region 12, the shoulder portion of the passenger is pushed out earlier than the chest portion of the passenger, so that the risk of the injuries at the chest portion and the abdomen portion by the structure invading inside the vehicle is reduced.

Although the preferred embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A side airbag comprising:
   a diffuser configured to supply gas discharged from an inflator to an inside of an airbag cushion;
   a separator partitioning an internal space of the airbag cushion so that an upper region of the airbag cushion is more rapidly inflated than a lower region of the airbag cushion by the gas introduced into the airbag cushion through the diffuser;
   a passage formed between the upper region and the lower region such that the gas flows between the upper region and the lower region; and
   the diffuser being fixed to an inner side surface of a rear end of the airbag cushion, the separator being fixed to the inner side surface of a front end of the airbag cushion toward the inner side surface of the rear end of the airbag cushion, and the passage being formed between the separator and the diffuser.

2. The side airbag of claim 1, wherein the separator is partitioned such that a volume of the upper region is smaller than a volume of the lower region.

3. The side airbag of claim 1, wherein the upper region has a pressure higher than a pressure of the lower region at a beginning of a deployment of the airbag cushion.

4. The side airbag of claim 1, wherein a front end of the separator is configured to be positioned beside a shoulder portion of a passenger, and a rear end of the separator is configured to be positioned beside a chest portion of the passenger.

5. The side airbag of claim 4, wherein the separator is inclined downwardly from a front end to a rear end of the airbag cushion such that the airbag cushion is partitioned.

6. The side airbag of claim 1, wherein the separator is attached to opposite inner side surfaces of the airbag cushion, and a maximum width of the separator in a deployed state is shorter than a maximum width of the airbag cushion.

7. The side airbag of claim 1, wherein a vent hole is provided at the lower region.

8. The side airbag of claim 1, further comprising an inner pocket formed in a tunnel shape in which a top end and a bottom end of the tunnel shape are open, the inner pocket surrounding the diffuser, wherein a rear end of the separator is fixed to an outer surface of a front end of the inner pocket, and a portion of the outer surface of the inner pocket except for the front end of the inner pocket is fixed to the inner side surface of the airbag cushion such that the passage is formed inside the inner pocket.

9. The side airbag of claim 1, wherein the diffuser is formed in a tunnel shape in which a top end and a bottom end of the tunnel shape are open, so that the gas discharged from the inflator is distributed to the upper region and the lower region.

10. The side airbag of claim 1, wherein the diffuser is formed in a tunnel shape in which a top end and a bottom end of the tunnel shape are open, so that the gas discharged from the inflator is distributed to the upper region and the lower region,
    wherein a cross-sectional area of the open top end of the diffuser is smaller than a cross-sectional area of the open bottom end of the diffuser.

11. The side airbag of claim 1, wherein the diffuser is formed in a shape in which a top end of the diffuser is open and a bottom end of the diffuser is closed, so that the gas discharged from the inflator is provided only to the upper region.

* * * * *